Jan. 29, 1952     J. H. KELLER ET AL     2,584,092
CUP DECORATING MACHINE Filed Feb. 17, 1948     6 Sheets-Sheet 1

INVENTORS
Jay H. Keller
BY Ray Riley
Wood, Arey, Herron & Evans
ATTORNEYS

INVENTORS
Jay H. Keller
BY Ray Riley
Wood, Arey, Herron & Evans
ATTORNEYS Jan. 29, 1952  J. H. KELLER ET AL  2,584,092
CUP DECORATING MACHINE
Filed Feb. 17, 1948  6 Sheets-Sheet 5

INVENTORS
Jay H. Keller
BY Ray Riley
Wood, Arey, Herron & Evans
ATTORNEYS

Patented Jan. 29, 1952

2,584,092

UNITED STATES PATENT OFFICE 2,584,092

CUP DECORATING MACHINE

Jay H. Keller and Ray Riley, Sebring, Ohio, assignors to Solar Engineering & Equipment Company, Beaver, Pa., a corporation of Pennsylvania Application February 17, 1948, Serial No. 8,914

7 Claims. (Cl. 101—38)

This invention relates to a semi-automatic machine for rapidly applying designs or decoration to ware such as cups, pitchers, and other articles of manufacture at peripheral portions adjacent handles or protrusions on the surfaces thereof. The invention is disclosed particularly in relation to a machine for decorating cups, since it has been found to be particularly advantageous for this purpose. However, the apparatus is well suited for operating upon ware of other types having one or more peripheral protrusions other than handles but presenting similar problems to the decorator.

The principal objective of the present invention has been to provide a decorating machine which will operate upon cups of different sizes and shapes to apply decorative indicia around the periphery of the ware, starting at a point closely adjacent one side of the cup handle, and terminating uniformly at a point closely adjacent the other side thereof; in other words, a continuous peripheral band of decoration excepting for that portion of the ware which is occupied by the handle, one or more of which the ware may carry. Heretofore, decorative media always has been applied to such articles by hand because of interference caused by the extension of the handle pieces from the ware or by the irregularity of the ware periphery.

A further objective of the present invention has been to provide a decorating machine having a chuck to which an operator may supply undecorated articles after which the machine may proceed automatically to apply the decoration and complete a cycle of operation for removal of a decorated article from the machine by the operator.

Essentially, the apparatus comprises a chuck or ware holder for rotatably supporting the ware and for initially disposing the handle of the ware in a predetermined position, a wheel having decorative means segmentally disposed on its periphery, and means for moving the ware and wheel relatively toward and from one another in such manner that the two rotate in peripheral contact with each other, and the leading edge of the segmental decorative area of the wheel engages the cup handle to locate the start of the applied decoration, after which the two members rotate in unison for application of the decoration about the periphery of the ware. The length of the decorating segment of the wheel corresponds to the peripheral distance from one side of the ware handle to the other or to the next protrusion; hence, when the decoration is started at the right point closely adjacent one side of the cup handle, the decoration will be terminated closely adjacent the other side of the handle in a neat, uniform and attractive manner and in much less time than heretofore has been required in hand methods of operation.

The decorating means carried by the wheel may be of any suitable type, such as a stencil and squeegee, or a rubber stamp for imprinting; a device of the latter type is illustrated in the drawings as a representative example of suitable apparatus. Also, depending upon the diameter and rate of rotation of the decorating wheel, one, two, three or more decorating segments may be arranged on its periphery, each positioned to engage a cup adjacent one point on the periphery thereof, apply the decoration to the cup, and terminate the application of the decoration at a predetermined point on the periphery, the speed of operation being dependent primarily upon the facility with which the operator can load and unload the chuck.

In the preferred embodiment of the invention, the decorating wheel is rotatable about a fixed axis and the chuck or ware holder is advanced toward and from the wheel periphery by means of a cam which is rotatable in unison with the wheel. Also, in a machine utilizing a flexible imprinting stamp for application of the decoration, a translatable inking roller is employed which acquires a film of ink or decorating media upon its surface from a feed roll and delivers material from this film to the stamp prior to each decorating cycle of the wheel whereby designs of full body thickness and clarity are provided.

A useful feature of the invention in respect to the convenient disposition of the cup handle at a relatively predetermined position in respect to the decorating wheel at the start of each cycle of operation is obtained by the provision of a rotatable ware holder having a clip, lug, or stop which engages or cooperates with the handle of the ware, and a pendulum which is fixed upon the rotatable chuck (or on the chuck itself), so as to bias the chuck rotationally to a predetermined position through the tendency of the pendulum to hang in a vertical position. This construction provides substantially unrestrained rotational movement of the ware holder which is desirable during a decorating application while the ware is being rotated by frictional engagement with the decorating segment of the wheel, but, at the termination of each operation, the pendulum causes the chuck to return, by gravity, to a starting position in which the chuck is positioned for the next cycle of operation. In the alternative, a torsion spring may be used to return the chuck to starting position, but the pendulum construction is preferred because the action is smoother and free of all vibration.

In order to provide positive means for indexing the chuck and ware handle, a pawl or suitable latch is arranged to engage a stop on the chuck. In its orbit of rotation the pendulum swings beyond its pendular position then tends to return but is prevented by engagement of the stop by the pawl. The pawl is so constructed and arranged to impart a positive rotational force upon the chuck as the frictional engagement of stamp decreases toward the end of the printing operation and thus prevents skids and smudging of the decoration at the trailing end of the stamp.

From the foregoing discussion of the principles of operation of the apparatus and from the following detailed description of the drawings in which a typical embodiment of the invention is disclosed, those skilled in the art readily will comprehend various modifications to which the invention is susceptible.

Figure 1:
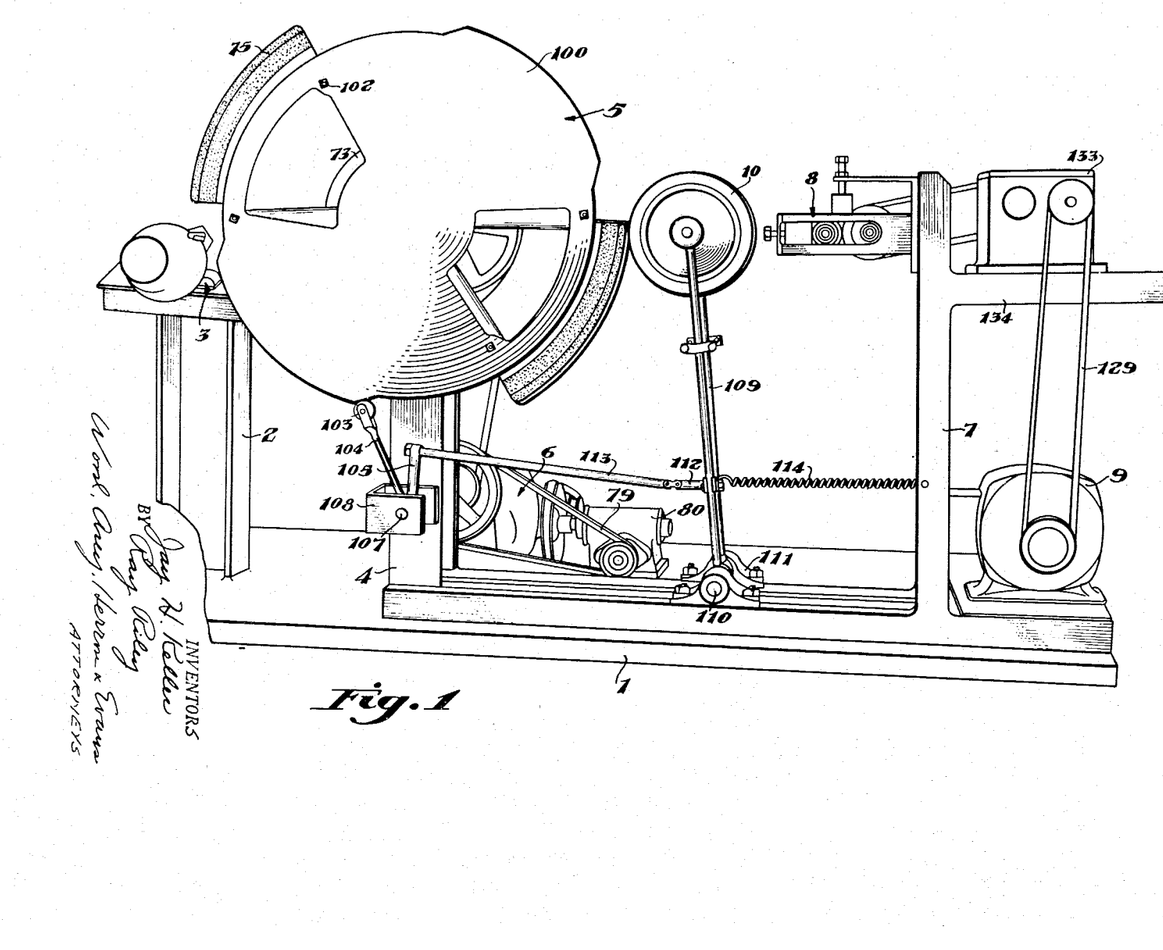
Figure 1 is a perspective elevation of the machine, as viewed from the front side thereof.

The apparatus shown in Figure 1 comprises a base 1, having a pedestal 2 adjacent one end thereof which supports a ware holding apparatus indicated generally at 3. A second pedestal 4, spaced from the first, is employed to support the decorating ware assembly indicated at 5, which is driven through power apparatus 6. Adjacent the far end of the base 1, the third pedestal, indicated generally at 7, is mounted to provide support for an ink feeding mechanism indicated generally at 8, which is driven from a motor 9. Intermediate the decorating wheel 5 and the ink feeding mechanism, a transfer roller 10 is located for delivering a film of ink from the feeder mechanism 8 to the decorating wheel 5. The base 1, and the respective pedestals, may be cast as an integral unit, or fabricated, as shown, from channel and beam members.

Figure 4:
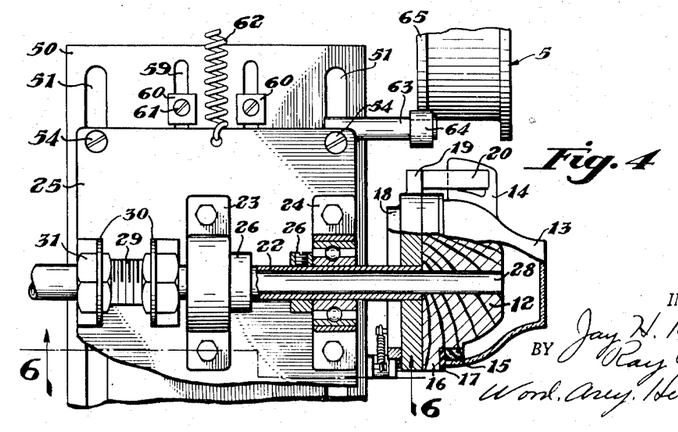
Figure 4 is a sectional plan view taken on the line 4—4 of Figure 2, showing further details of construction of the chuck apparatus.

In the construction shown, the ware holding apparatus 3 comprises a chuck member 12, which is shaped to fit the interior contour of the ware 13 to be decorated, i. e., a cup having a handle 14 pending laterally from its periphery. The chuck at its periphery preferably includes a rubber band 15, as shown in Figure 4, which by its resilience, forms a friction fit with the ware and also serves as a gasket. The chuck 12 adjacent the member 15 is provided with a shoulder portion 16 which also may be faced with a rubber ring as at 17, this latter member also serving as a gasket and as a resilient stop against which the edge of the ware may reside in abutment. The chuck, per se, is removably mounted by screws (not shown) on a face plate 18 which, in the construction shown, is provided with a lug 19 on its periphery. The lug has flexible ears 20 extending from it in spaced relationship to one another for the purpose of receiving therebetween the handle portion 14 of the ware. In this or another suitable manner, a cup conveniently may be located in a fixed position on the chuck.

The face plate 18 is fixed upon one end of a tubular shaft 22. This shaft is rotatably journalled in anti-friction pillow blocks 23 and 24, which are mounted upon a slide plate 25. Collars 26—26 are carried by the shaft 22, engaging adjacent faces of the bearings in the respective pillow blocks and thus holding the shaft against longitudinal movement. The construction shown is adapted particularly for utilization of a vacuum to assist in holding the ware upon the chuck. Thus, a bore 28 is provided in the chuck member 12 in alignment with the chuck tube 22 whereby a negative pressure created in the tube will cause the ware to be held firmly in position. For ultimately relieving the vacuum, a valve and gland apparatus is utilized, as shown particularly in Figure 3 of the drawings. In this construction, a chuck tube 22 passes rotatively through a sleeve 29, which is externally threaded at its endwise portions. The sleeve passes through bores in footed brackets 30. These brackets are spaced apart from one another and are fixed upon the slide plate 25. To hold the sleeve 29 in place, nuts 31, threaded onto the sleeve, are mounted at opposite faces of the brackets 30. The sleeve 29 has an inlet port 32, and the chuck tube 22 has a cooperating bore 33; when these bores are in alignment, the vacuum is relieved and ware may be removed readily from the chuck 12.

Figures 2, 3:
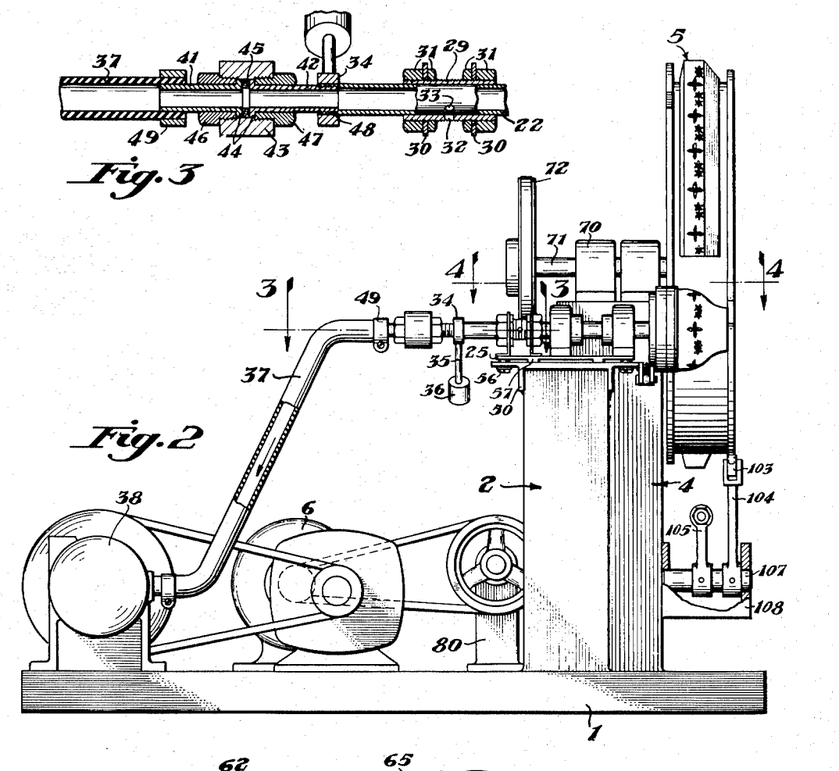
Figure 2 is an end elevation showing the cup, chuck and decorating apparatus.
Figure 3 is a longitudinal sectional view taken through a portion of the chuck or ware holder apparatus on the line 3—3 of Figure 2.

Chuck shaft 22 extends beyond the brackets 30 and beyond slide plate 25, where a ring 34 is fastened to it. This ring has a rod 35 extending radially from it and at the end of the rod a weight 36 is mounted, whereby the rod and weight act as a pendulum which, by gravity, will assume the vertical position.

The vacuum is supplied through a line 37, which is taken from a suitable vacuum pump 38 which may be mounted on the base plate 1. In order to accommodate free rotation of the chuck shaft 22, with respect to the vacuum line, a rotary gland is utilized, comprising nipples 41 and 42 extending in opposite directions from the gland body 43. These nipples within the body are flanged as at 44, and a packing ring 45 may be applied between the flanged ends of the nipples to provide a seal. The opposite sides of the flanges are engaged by nuts 46 and 47 respectively threaded onto the opposite ends of the gland body 43. One end of this gland assembly is threaded into the chuck shaft 22, as at 48; hence, is rotatable with the chuck shaft, while the endwise portion extends into the delivery tube 37 wherein it is clamped by a squeeze ring 49. Thus, in view of this construction, negative pressure may be exerted so long as the bores 32 and 33 are out of alignment, and whenever ware is located on the chuck. On the other hand, the bores 32 and 33 radially are disposed in respect to one another to be out of alignment when the chuck is in a predetermined starting position, as described at a later point in the specification.

The chuck slide 25 is movable upon the table member 50, which is located at the top of the pedestal 2. Table 50 is slotted near its edgewise portions, as at 51—51 and, as shown best in Figure 6, these slots, which are parallel to one another, contain roller members 53 which are journalled upon stud bolts 54 extending downwardly from the slide plate 25, with the rollers 53 being held in place by washers 55 and nuts 56, located at the underneath surfaces of the table 50. Also for the purpose of reducing friction, the lower surface of the slide plate 25 is provided with ribs 57—57 which separate the main surface area of the slide plate slightly from the main surface area of the table 50. In view of this construction, it may be seen that the slide plate is guided for linear movement toward and from the decorating wheel 5. In addition to the guide slots 51, the table 50 contains slots 59 which are employed adjustably to sustain stop members 60, the latter being held in place by means of clamp screws 61 which pass through the slots to carry nuts (not shown) at the underneath surface of the table. These stops limit the movement of the slide plate 25 toward the decorating wheel.

A tension spring 62 extends from an edgewise portion of the slide plate to a pin 66 which is fastened on the pedestal 4. In this manner, the spring biases the whole movable chuck assembly toward the decorating wheel. For moving the assembly away from the decorating wheel, the slide plate carries a rigid arm 63, having a follower 64 which engages a cam driven by suitable means in unison with the rotation of the decorating wheel. In the construction shown, the cam 65 constitutes a part of the decorating wheel assembly.

Figure 5:
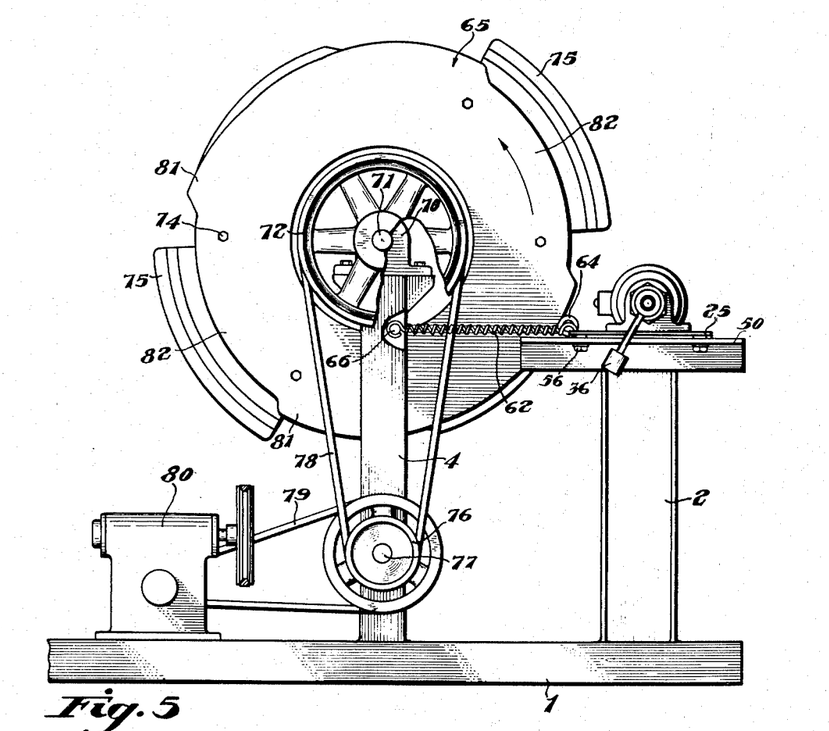
Figure 5 is a rear elevation of the machine.

Pedestal 4 at its upper extremity carries a pillow bracket 70, which rotatably supports a shaft 71, see Figures 2 and 5. A projection of the shaft at one side of the pillow block carries a drive pulley 72 and a projection of the shaft at the other side of the pillow block carries a spider 73 which forms the frame of the decorating wheel. This spider conveniently may be in the form of a pulley of substantial diameter having a rim upon which a segmental rubber stamp device 75 can be mounted.

A two step pulley 76 is rotatably mounted upon a shaft 77 which extends laterally from a lower portion of the pedestal 4. A belt 78 extends from the smaller diameter of the two step pulley 76 to the decorating drive wheel pulley 72, while the larger diameter of the two step pulley 76 is driven by a belt 79 from a speed reducer 80, the latter being powered from the motor 6, all of these members of the machine being mounted on the base plate 1.

Cam 65 is in the form of a disk-like member fastened, as by bolts 74, to the face of the spider 73 of the decorating wheel assembly. This cam has throw portions 81 at its periphery for controlling the advancement and recession of the chuck assembly toward and from the decorating members at the periphery of the wheel 5. In the construction shown two decorating stamp assemblies 75 are utilized for operating alternately upon successive pieces of ware, and the cam 65 therefore has two throw portions 81 and two land portions 82 intermediate the throws. Followed by the roller 64, the land portions permit the chuck assembly to advance toward the decorating wheel under the influence of spring 62. If the work is of a uniform circular contour in periphery, then these lands may be concentric with respect to the axis of rotation of the wheel, whereby the chuck will advance to a position where the work is engaged by a stamp and remain stationary in such position, during decorating, until the end of the decorating cycle, at which time the follower 64 will be engaged by a lift portion at the beginning of the throw of the cam and thus moved away from the wheel for removal of the finished piece and replacement on the chuck of a new piece to be decorated in the next successive decorating cycle. Meanwhile, the wheel continues to rotate, and when the end of the lift portion 81 of the cam is reached, the roller 64 follows the cam contour and permits the chuck assembly to move toward the wheel for another decorating cycle.

On the other hand, if the work is of non-uniform character, for example oval in contour, then the lands 65 may be eccentric to the axis of rotation so as to cause the chuck to move relative to the axis of rotation of the ware during the printing operation at a rate corresponding to the eccentricity of the ware. In a similar manner the lands may be modified to conform to various other irregular ware contours, in each instance the degree of eccentricity being equal in degree to the ware and correlated circumferentially to the periphery of the ware.

Figures 16, 17, 18, 19, 20:
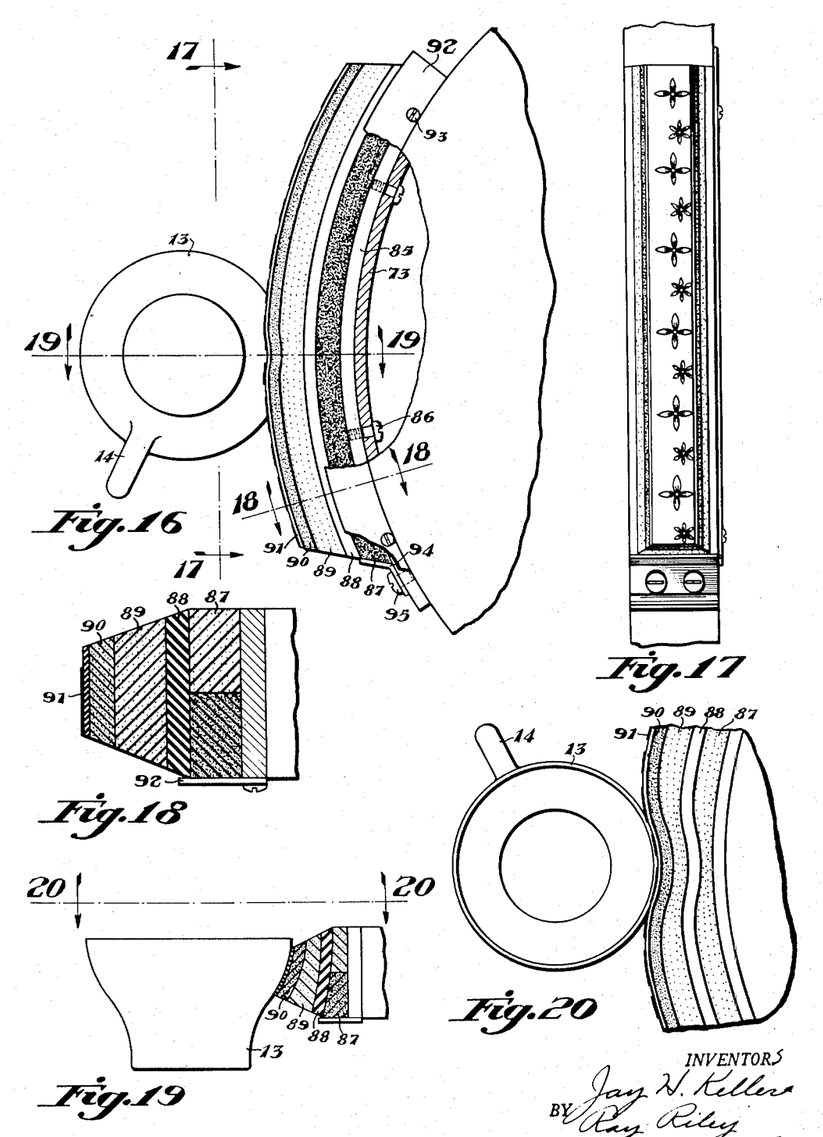
Figure 16 is a fragmentary sectional view showing suitable construction of a resilient printing stamp, and engagement of the stamp with the ware during decorating.
Figure 17 is a developed view of the stamp or decorating element to show a typical design thereon as taken on the line 17—17 of Figure 16.
Figure 18 is a sectional view through the stamp taken on the line 18—18 of Figure 16.
Figure 19 is a sectional view as taken on the line 19—19 of Figure 16 showing engagement of the stamp with the periphery of a cup and also showing the relative deformation of the stamp through its engagement with the contour of the ware.
Figure 20, taken on the line 20—20 of Figure 19, also shows the relative conformattion of a resilient stamp with the ware.

A suitable stamp construction for use in the decoration of cups and like is shown in Figures 16 to 20, inclusive. This assembly comprises a shoe member 85, of metal or suitably rigid material, which is shaped to conform with the contour of the rim of the wheel spider 73. Also, the shoe is bored and threaded so that it may be fastened on the spider periphery by means of bolts 86 which pass through the rim. The shoe carries a number of layers of rubber of graduated resiliency. These layers, or laminations, are indicated at 87, 88, 89 and 90. The face of the outer rubber layer 90 has a rubber stamp member 91 cemented to it. Graduation of the resiliency of the rubber laminations enables the stamp face to sustain substantial distortion and hard track upon the periphery of the ware without producing smeared or blurred designs. Thus, as shown in Figures 19 and 20, the stamp face is distorted laterally through the compressed engagement of the stamp and ware, and this distortion varies laterally of the stamp, due to the fact that the ware varies in diameter, even at the portion thereof which receives the decoration. It has been discovered that remarkably clear and sharp applied designs may be obtained, which are devoid of blurring, by utilizing base laminations 87, which are of substantial thickness and also substantial resiliency. These laminations absorb a substantial part of the distortion. However, this layer is restrained against lateral collapse by a thinner and somewhat less resilient layer 88. The next two layers, 89 and 90, are similar respectively to the layers 87 and 88 as to thickness, resiliency and function, and it will also be noted that the layers are wider at the bottom of the stamp assembly than at the stamping face thereof. In this manner, very substantial distortion, which is necessary to accommodate flared mouth cups, may be provided. In addition, as shown in Figure 19, further control in respect to the formation may be obtained by utilizing rubber of graduated resiliency at respective portions of the individual layers. Thus, for example, the rubber in the bottom layer 87 at the side thereof which suffers the greatest compression, may be made of more resilient material, or more easily compressed material, than the rubber at the opposite side, where the distortion is less. Similar graduations may be utilized in the other layers of the stamping assembly. These aspects of my invention are explained and disclosed in my co-pending application, Serial No. 64,973 entitled "Stamp for Decorating." If desirable, further support of the assembly may be provided through the use of a sustaining wall 92, which is fastened by screws 93 along one edge of the shoe 85, so as to extend part way along the side wall of the stamp. The front or leading edge of the stamp engages the periphery of the ware adjacent the handle. Therefore, the leading edge may be chamfered as shown in Figure 16 to enable the front edge of the stamp 90 to reside directly adjacent the base of the handle.

A buttress plate 94, which is fastened upon the shoe 85 by means of a screw 95, provides additional support for the trailing edge of the stamp.

In the construction shown, ink film is delivered to the stamp faces by a transfer roller 10, which in turn is supplied with ink from a feed roll mechanism 8. The transfer roll oscillates between the stamp and the ink roll, and as a matter of convenience, this oscillation is timed in relation to the rotation of the decorating wheel by means of a cam 100, which is fastened by bolts 102 to the wheel spider in the same manner as cam 65 is held.

The cam 100 is engaged by a follower 103, which is supported upon one arm 104 of the bell crank, having a second arm 105. The bell crank is free to rock upon a shaft 107, which is mounted between the arms of a U-shaped bracket 108 fastened to a lower portion of the pedestal 4. Feed roller 10 is rotatively journalled in a fork member 109, the opposite end of which is mounted on a rock shaft 110, sustained by spaced pillow blocks 111. At a point intermediate its ends, the fork member 109 has a link 112 extending laterally from it, which is in articulated connection with a shaft 113 extending from the bell crank arm 105. The fork 109 is biased away from the decorating wheel or toward the feed roll assembly 8 by means of a spring 114, which extends from the pedestal 7 to the fork 109. For control purposes, the lifts at lands of the inking cam 100 are positioned to advance the inking roll toward the decorating wheel for engagement of a decorating segment with the roll, followed by movement of the transfer roll to the feed roll during the period while the other decorating segment is operating upon the ware.

Figure 14:
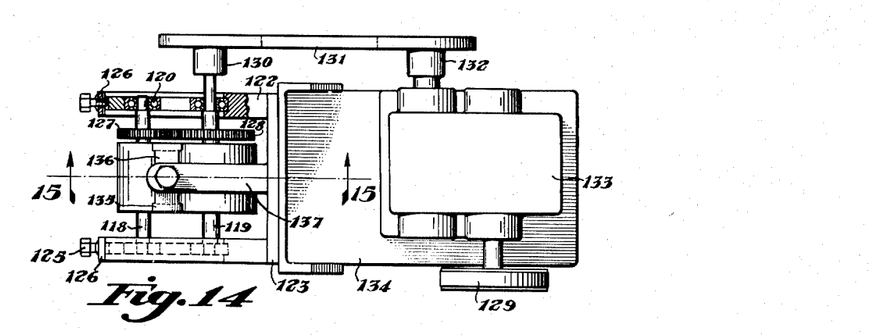
Figure 14 is a plan view of suitable feed rollers for applying a film of ink or decorative media to a transfer roller.
Figure 15:
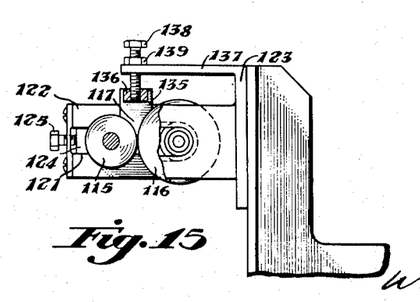
Figure 15 is a fragmentary sectional view as taken on the line 15—15 of Figure 14.

Any suitable ink feeding mechanism is used to replenish the film of ink upon the transfer roll. The device shown in the drawings, particularly Figures 14 and 15, comprises a pair of rolls 115 and 116, which are in peripheral engagement so as to form a nib or reservoir 117 therebetween, within which a pool of ink may be deposited. The rolls 115 and 116 are mounted upon shafts 118 and 119 respectively, which are journalled in anti-friction bearings 120, the latter being located in slots 121 which are cut in arms 122. The arms project from a base plate 123, which is fastened to the face of pedestal 7. Pressure of engagement of the peripheries of the rolls 115 and 116, by which the thickness of the film of ink passing between the rolls may be controlled, is governed by block members 124, which abut the anti-friction bearings at the ends of the shaft 118. These blocks in turn are moved by means of screws 125, which are threaded through end plates 126 at the ends of the arms 122. Rolls 115 and 116, for equalization purposes, are of different diameters and they are driven in unison by means of meshing gears 127 and 128 which are fixed respectively upon the shafts 118 and 119. Shaft 119 extends through one of the arms 122 and carries a drive pulley 130, which is driven by a belt 131 from a pulley 132 extending from a gear box 133. The gear box is driven by a bolt 129 from the motor 9 and the gear box, as shown in Figure 1, is supported from a table 134 extending from the pedestal shelf. For the purposes of preventing escape of the pool of ink in the nib 117 from the ends of the rolls 115 and 116, end plate members 135, of conventional design, may be utilized. These end plate members depend from a cross bar 136 which is arranged beneath a support arm 137 extending laterally from the upper edge of the base plate 123. A bolt 138 is threaded through the arm 137 so as to bear upon the cross bar 136 and thereby exert pressure on the end plates, bolt 138 being locked in position by a nut 139.

Figures 7, 8, 9:
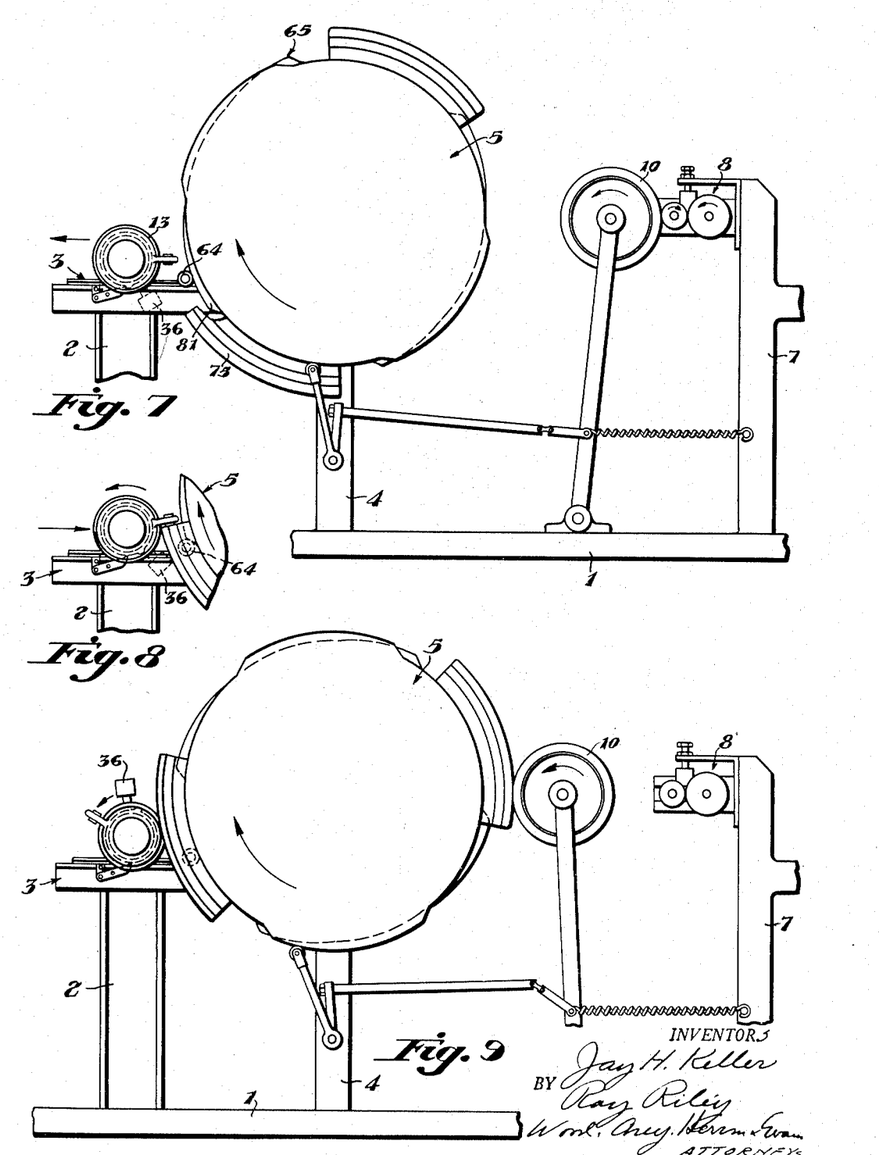
Figure 7 is a somewhat diagrammtaic elevation showing the relationship of the ware, decorating wheel, the ink feeding apparatus, and cam control apparatus prior to the start of a decorating operation.
Figure 8 is a fragmentary view similar to Figure 7, but showing cooperation of the cup and decorating segment at the beginning of a decorating operation.
Figure 9 also is a view similar to Figure 7, but shows the relationship of the parts during a printing operation.
Figures 10, 11:
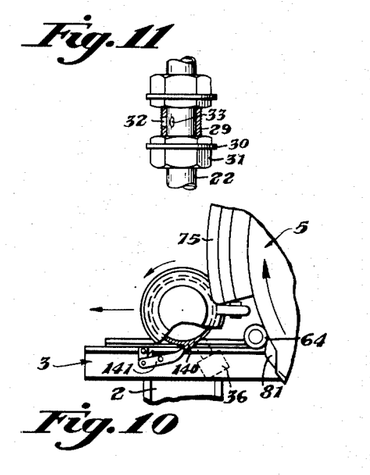
Figure 10 is a fragmentary diagrammatic elevation showing the relationship of the ware and recorating wheel at the completion of a decorating operation.
Figure 11 is a fragmentary view similar to Figure 3 showing the position of the control valve at completion of the printing operation.

Figures 7 to 12 inclusive show the relative positions of the elements of the assembly during the respective phases of operation of the machine. Pendulum 36 radially is positioned with respect to the clips 20, which engage the handle of a cup in such a manner that the handle is locked in a substantially horizontal position by a pawl hereinafter described, biased by the pendulum which is hanging at an angle to the perpendicular (Figure 7). As shown in Figure 11, the bore 33 of the chuck shaft is out of alignment with the inlet aperture 32 of the vacuum control valve whereby the ware is subject to the negative pressure provided from pump 38. It may be seen that at this time that the chuck cam follower 64 is near the end of the throw 81 of the chuck cam 65. As rotation continues, the cam follower will leave the end of the throw and follow down the cam slope to the land 82, and the chuck will advance toward the decorating wheel, but the parts are so positioned that at this time, the leading edge of the decorating stamp will engage the handle and the ware will be set into rotation as the face of the stamp engages the periphery of the ware. One virtue of this arrangement resides in the fact that the ware initially is subject to positive rotation, which avoids any slippage in overcoming the inertia of the parts in placing them into rotation. Subsequently, the rotaton of the ware is continued by the friction of engagement of the stamp therewith. The stamp continues to track about the periphery of the ware until the end of the stamp has reached a point adjacent the opposite side of the handle. During this time, of course, frictional engagement between the wheel and the ware causes the pendulum to be swung in unison with the ware. During this phase of operation, the ink mechanism follower 103 has been driven by a throw portion of the ink cam 100, so as to move the transfer roller into the engagement with the periphery of the other stamp, whereby it has acquired a fresh film of decorating material.

Figure 6:
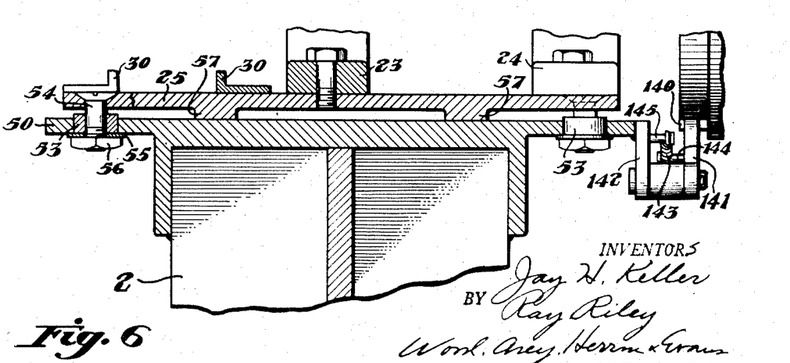
Figure 6 is a vertical sectional view taken on the line 6—6 of Figure 4.

As the stamp approaches the end of its decorating phase of operation, the follower 64 becomes engaged by the lift or throw of cam 65; hence, the chuck and ware begin to move away from the wheel. During this retractive movement of the chuck, a positive rotative force simultaneously is imparted to the chuck at a rate correlated to the peripheral advance of the printing shoe. This is for the purpose of preventing skidding or slippage between the surface of the ware and shoe due to the fact that the frictional engagement between the two surfaces progressively decreases as the trailing edge of the shoe is reached. As shown in Figure 10, illustrating this condition, the rise or leading edge of cam lift 81 engages roller 64 to retract slide plate 25 and chuck 12 at or about the same time the trailing edge of the shoe is finishing the decorating operation, at which time there is likelihood of slippage and smudging. To provide a positive driving force, the chuck includes a stop 140 engaged by the end of a pawl 141 pivotally mounted upon lug 142 secured to the table 50 (Figure 6). The operating end of the pawl thus is disposed approximately in line with the center of the chuck and urged upwardly against the chuck by a tension spring 143 having its opposite ends anchored upon pins 144 and 145 secured to the pawl and lug respectively. It will be apparent in Figure 10 that as the slide plate and chuck retract relative to the pawl, the engagement of the stop 140 against the end of the pawl, causes the chuck to rotate in a direction and rate corresponding to the surface rotation of the shoe. This prevents slippage and results in a clear and sharp impression around the ware and especially in the handle area where slippage is most likely due to reduce frictional engagement.

Figures 12, 13:
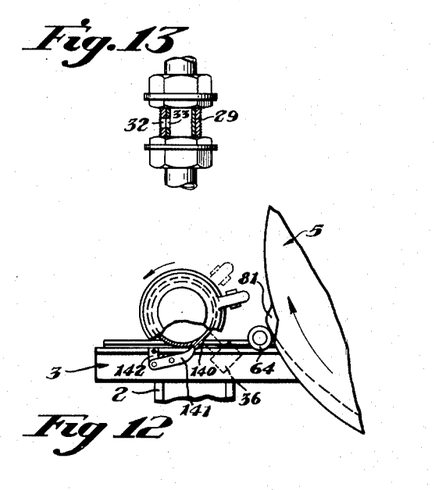
Figure 12 is a diagrammatic view similar to Figure 10 showing the ware retracted to a position of rest after completion of the printing operation and in broken lines showing it manually rotated to open the control valve to relief position for removal of the ware from the chuck.
Figure 13 is a view similar to Figure 11 showing the control valve in open position corresponding to the position of the ware as shown in broken lines in Figure 12.

When the slide and chuck is fully retracted, the ware handle assumes the position shown in Figure 12. At this point the relief valve is closed as shown in Figure 11. To release the ware, the operator now rotates the ware and chuck by hand and rotates it to the position shown in broken lines to bring the ports 32 and 33 into alignment as shown in Figure 13, which relieves the vacuum and permits removal of the ware. After removal, the pendulum causes the chuck to swing back to its starting position with stop 140 engaged against pawl 141 as shown in full lines in Figure 12. Thus the pawl holds the ware accurately positioned so that the handle of the ware registers with the leading edge of the printing shoe at the start of the next operation.

Having described my invention, we claim:

1. A ware decorating machine adapted to apply decorative indicia around the periphery of ware pieces having one or a plurality of lateral projections, comprising; a rotary printing drum having arcuate printing devices on its circumference, proportioned to the cylindrical circumference of the ware between the lateral projections thereof, a ware holding chuck slidably mounted adjacent said printing drum for movement in a path parallel to the plane of rotation of said drum, means for rotating said drum, spring means for urging said ware holding chuck toward said printing drum, cam means associated with said printing drum arranged to shift said chuck toward said drum circumference in timed relation to the rotation of said printing drum, to present the leading edge of the printing device to the ware at a point on the circumference of the ware adjacent a lateral projection thereof and to shift the chuck away from the circumference of said printing drum against the bias of said spring means when the trailing edge of said printing device approaches a lateral projection on the ware.

2. A ware decorating machine adapted to apply decorative indicia around the periphery of cylindrical ware, having a lateral projection comprising; a rotary printing drum having arcuate printing shoes proportioned to the cylindrical circumference of the ware between the lateral projection, a table, a slide plate on said table having a ware holding chuck rotatably mounted adjacent said printing drum, cam means mounted on said printing drum and arranged to shift said slide plate and chuck laterally in timed relation to the rotation of said printing drum to present ware to the leading edge of the printing shoe at a point on the ware adjacent said lateral projection and to shift the ware away from said printing drum when the trailing edge of said printing shoe approaches the lateral projection on the ware, a pawl pivotally mounted on said table, and an abutment on said chuck engageable by said pawl to impart positive rotation to said chuck and ware when said slide plate is shifted during engagement of the ware by the trailing edge of said printing shoe to prevent slippage therebetween.

3. An apparatus for decorating the circumference of cups and the like having substantially a cylindrical contour and having a lateral handle extension comprising; a rotary printing drum, a rotary ware mounting chuck slidably mounted adjacent said printing drum, arcuate printing shoes on said printing drum arranged to frictionally engage and rotate the ware mounted upon said chuck, stop means on said chuck for locating the handle of said ware relative to said printing drum to cause the leading edge of the printing shoe to contact the ware adjacent said handle, latching means for said chuck to latch the same against rotation in a direction opposite to the printing direction of the chuck, means for rotationally biasing said chuck toward said latching means to hold the ware accurately positioned relative to the leading edge of the printing device, and means for advancing and retracting said chuck in timed relationship to said printing drum, said latching means being arranged to impart positive rotation to said chuck and ware when the chuck is retracted during engagement of the ware by the trailing edge of said printing shoe.

4. A ware decorating apparatus comprising; a rotary printing drum having arcuate printing shoes mounted thereon, a rotatable ware mounting chuck slidably mounted adjacent said printing drum for a frictional engagement by said printing shoes, spring means for urging said chuck toward the printing shoes of said drum, a cam driven in unison with said printing drum for urging said chuck away from the shoes of said printing drum against the bias of said spring, in timed relation with the rotation of the printing drum, means for rotatably biasing said chuck in a given direction of rotation, a ratchet carried by said chuck, and a pawl cooperatively associated with said ratchet for restraining rotation of the chuck against the biasing means to hold the chuck in a predetermined starting position.

5. An apparatus for decorating the circumference of cups and the like having substantially a cylindrical contour and having lateral handle extensions comprising; a rotary printing drum, a rotary ware mounting chuck slidably mounted adjacent said printing drum, arcuate printing devices on said printing drum arranged to frictionally engage and rotate the ware mounted upon said chuck, stop means for locating the handle of said ware relative to said printing drum to cause the leading edge of the printing device to contact the ware adjacent said handle, pawl means for said chuck to latch the same against rotation in a direction opposite to the printing direction of the chuck, and means for rotationally biasing said chuck toward said latching means to hold the ware accurately positioned relative to the leading edge of the printing device.

6. A decorating apparatus for ware pieces having lateral projections comprising; a rotary printing drum having arcuate printing shoes mounted thereon, a rotatable ware mounting chuck slidably mounted adjacent said printing drum for a frictional engagement by said printing shoes, means for urging said chuck into engagement with said printing shoes in timed relation with the rotation of the printing drum, a pendulum associated with said chuck to rotatively bias the same, a pawl associated with said chuck and engageable to hold the same against rotation in the direction of bias, to hold the chuck stationary in a predetermined starting position, and means on said chuck engageable with a projection on the ware to key the ware radially with respect to said pendulum.

7. A machine for decorating cups and like articles of ware at peripheral surfaces thereon bounding laterally extending handle projections thereof, comprising, a rotatable disc having a resilient printing stamp of arcuate shape mounted upon its circumference, means for rotating said disc in the plane of its configuration, a rotatable ware supporting chuck member translatably mounted adjacent the circumference of said disc member for movement in a path which is parallel to the plane of configuration of said disc, said chuck member having means associated therewith for engaging a handle of the ware, to locate the ware in predetermined position on said chuck, and means for effecting translation of said chuck member toward and from the circumference of said disc comprising, a spring for biasing the chuck member toward the disc circumference, and a cam for driving the chuck member away from the chuck circumference, said cam being positioned to produce movement of the chuck member under influence of the spring toward the disc circumference, for pressure engagement of the printing stamp with the circumference of the ware at one side of the lateral projection of the ware and to effect disengagement of the ware before the printing stamp reaches the opposite side of the lateral projection of the ware.

JAY H. KELLER.
RAY RILEY.

REFERENCES CITED

The following references are of record in the file of this patent:

UNITED STATES PATENTS

| Number | Name | Date |
|---|---|---|
| 2,009,098 | Smith | July 23, 1935 |
| 2,088,196 | Friden | July 27, 1937 |
| 2,288,298 | Norman | June 30, 1942 |
| 2,351,552 | Shurley | June 13, 1944 |
| 2,425,928 | Emerson | Aug. 19, 1947 |

FOREIGN PATENTS

| Number | Country | Date |
|---|---|---|
| 493,857 | Great Britain | Oct. 17, 1938 |